United States Patent
Moelker

(10) Patent No.: US 7,607,053 B2
(45) Date of Patent: Oct. 20, 2009

(54) METHOD AND DEVICE FOR CALCULATING BIT ERROR RATE OF RECEIVED SIGNAL

(75) Inventor: Dignus-Jan Moelker, Voorhout (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 654 days.

(21) Appl. No.: 10/596,856

(22) PCT Filed: Dec. 30, 2003

(86) PCT No.: PCT/EP03/14983

§ 371 (c)(1),
(2), (4) Date: Jun. 27, 2006

(87) PCT Pub. No.: WO2005/064841

PCT Pub. Date: Jul. 14, 2005

(65) Prior Publication Data

US 2007/0162788 A1    Jul. 12, 2007

(51) Int. Cl.
*G06F 11/00*    (2006.01)
*H03M 13/03*    (2006.01)

(52) U.S. Cl. ..................... 714/704; 714/794
(58) Field of Classification Search ............... 714/704, 714/786, 794–795
See application file for complete search history.

(56) References Cited

U.S. PATENT DOCUMENTS

| 6,141,388 A | 10/2000 | Johnson et al. |
| 6,163,571 A | 12/2000 | Asokan et al. |
| 7,065,159 B2 | 6/2006 | Rege et al. |

*Primary Examiner*—Shelly A Chase

(57) ABSTRACT

System and method of estimating radio channel bit error rate (BER) in a digital radio telecommunications system wherein the soft output of the turbo decoder is used as pointer or index to look-up-tables containing the bit-wise BER of a certain bit in the data field of the received frame. A quantizer quantizes the received data frame and the quantized bit operates on a switch which selects the appropriate look-up-table. By means of accumulation and scaling the average BER of a certain amount of bits are calculated. Decoding bit-errors may occur but as they are submitted to posterior probability estimation, systematic errors which normally happen at low SNR are avoided.

18 Claims, 1 Drawing Sheet

METHOD AND DEVICE FOR CALCULATING BIT ERROR RATE OF RECEIVED SIGNAL

TECHNICAL FIELD OF THE INVENTION

This invention relates to radio telecommunication systems and, more particularly, to a system and method of estimating radio channel bit error rate in a digital radio telecommunications system.

BACKGROUND OF THE INVENTION

The propagation of an electromagnetic signal from sender to receiver is affected by the imperfections of the transmission channel. As the electromagnetic signal travels from the transmitting antenna to the receiving antenna, it encounters a transmission channel that is subject to reflections on different stationary and non-stationary objects resulting in so-called multi-path fading, by noise due to a variety of factors, for example background noise, noise introduced through transmitter and receiver components, noise introduced through atmospheric transmission conditions, and interference introduced from other transmitters operating on interfering carrier frequencies.

As a result of this imperfect transmission channel, the signal received at the receiving antenna is typically not the same as the signal that was transmitted by the sender. Consequently, techniques are applied to enable the detection and possible correction of bit errors by error detection coding and/or error correction coding.

To ensure that the transmitted information and the received information are to a determined probability the same, there should be a way for the receiver to deduce, to determined probability, when received information contains errors. Furthermore, if errors are detected, a mechanism is needed to obtain the correct information.

A first mechanism to achieve the above indicated wish is the feedback (backward) error detection in which each character or frame includes only sufficient additional information to enable the receiver to detect if errors are present but not their location. Normally a retransmission control scheme is used to request that a copy of the information be again sent. This first mechanism will not be further described, as it is well known by anybody skilled in the art.

A second mechanism that can be used is the so called forward error correction (FEC) coding, in which each transmitted character or frame contains additional (redundant) information so that the receiver can not only detect if errors are present but also determine where in the received character or frame the errors are. The correct information is then obtained by inverting these bits. The forward error correction (FEC) coding techniques, such as algebraic coding or block coding, convolutional coding, concatenated coding and turbo coding, will not be further explained as they are very well-known by those skilled in the art.

The above mentioned encoders are typically located in the transmitting station whereas the decoders are typically located in the receiving station of a digital communication system. Decoders use redundant information added by the encoder to detect and correct bit errors caused by the adverse effects of the communication channel.

Optimal decoding of turbo codes is often a very complex task, and may require large periods of time not usually available for on-line decoding. Iterative decoding techniques have been developed to overcome this problem. Rather than determining immediately whether received bits are zero or one, the receiver assigns each bit a value on a multilevel scale representative of the probability that the bit is one or zero. A common scale, referred to as log-likelihood ratio (LLR) probabilities, represents each bit by an integer in some range, e.g. $\{-32,31\}$. A value of 31 signifies that the transmitted bit was a zero with very high probability, and a value of $-32$ signifies that the transmitted bit was a one, with very high probability. A value of zero indicates that the logical bit value is indeterminate. Values represented on a multilevel scale are referred to as "soft data" and are generally used by a decoder, that performs iterative decoding from former iterations, to decode the soft data read by the receiver. During iterative decoding of multiple-component codes, the decoder uses results from decoding of one code to improve the decoding of the second code. When parallel encoders are used, as in turbo coding, two corresponding decoders may conveniently be used in parallel for this purpose. Such iterative decoding is carried out for a plurality of iterations until it is believed that the soft data closely represents the transmitted data.

Probability deals with calculating the likelihood of a given event's occurrence given a certain amount of information about this event. This is especially clear when the probability of something that has already happened. With a probability that x was sent, p(x), a probability is meant that x was sent given the amount of information that there is about the event. Usually that is not only the received noisy version of x, but also information of the coding scheme, transmission link, etc.

In some cases some information of the transmitted message is available before the received message is decoded. That may comprise information that some messages are more likely to occur than others or information from other transmitted sequences. This is called "a priori information" and associated with it are the a priori probabilities. In a similar way the concept of a posteriori probabilities is known when both the a priori information probabilities and the information gained by the decoding are included.

For turbo codes there are two encoded sequences. The decoding starts by decoding one of them in order to get a first estimate of the information sequence. This estimate is then used as a priori information in the decoding of the second encoded sequence. This requires that the decoder is able to use a soft decision input and to produce soft output. The above mentioned turbo decoder consists of Soft-In-Soft-Out (SISO) decoders that work cooperatively and are implemented with Logarithmic Maximum A Posteriori (Log-MAP) algorithm. Each decoder produces a posteriori information, which is used as priori information by the other decoder.

The two most common decoding strategies for turbo codes are based on a MAP or A Posteriori Probability (APP) algorithm and a Soft Output Viterbi Algorithm (SOVA). Regardless of which algorithm is implemented, the turbo code decoder requires the use of two component decoders having a same algorithm and that operate in an iterative manner. These methods provide soft outputs representing the a posteriori log likelihood ratios for the received bits.

In a typical decoding operation, the first decoder generates statistical information based on the data received from the first component encoder. This information is then fed to the second decoder, which processes it along with the data received from the second component encoder. After decoding, the improved and updated statistical information is fed back to the first decoder, which starts the process again. This process continues for a number of iterations, typically six to ten iterations for each block of data, after which the actual data estimates are produced.

In one variation of the Viterbi algorithm, the received encoded bits are characterized not just by their bit polarities, but by a magnitude or quality measure representing the degree of "ONE-ness" or "ZERO-ness." When a strong received symbol matches a locally predicted symbol, the confidence factor for the path is increased significantly whereas a weak received symbol would increase the confidence factor to a lesser extent. A received symbol which does not match the locally predicted symbol will decrease the confidence factor of the corresponding path with the amount of decrease determined by the strength of the mismatching received symbol. This is typically referred to as soft decoding as opposed to hard decoding.

Despite the use of error detection and correction techniques, the quality of the channel can nonetheless be such that some of the received information bits are erroneous, even after error correction has been performed by the receiver. Depending on the application, a certain number of bit errors per unit of time may be tolerable, such as where the information bits represent voice information carried over a cellular telephone call. In such cases, errors may cause the quality of the sound to degenerate, but the sound reproduced from this erroneous bit stream may nonetheless be acceptably recognizable to the listener. At or above a particular level however, the bit error rate becomes unacceptable because the amount of audio distortion makes the received speech difficult to understand. In a telecommunication transmission, the Bit Error Rate (BER) is the percentage of bits that have errors relative to the total number of bits received in a transmission.

In many radio communications systems, actions that can be taken when the BER becomes too large to provide acceptable service include retransmitting the information (e. g. retransmitting the erroneously received block of bits), and/or taking steps to reduce the BER in future transmissions. A simple way to reduce the BER might be to increase the transmitted power level used by the transmitter such that under all conditions there is still a reliable signal at the receiver. However, in a cell based mobile communication system, increasing signal strength in one cell will result in increased interference in the adjacent cells resulting in an increased BER in those cells. It is therefore advantageous to be able to deal with a signal having the lowest possible carrier to interference (C/I) ratio, or the lowest possible signal to noise ratio (SNR) as it enables usage of lower power by transmitter and receiver equipment and thereby reducing the size and power requirements of the handset, and possibly increasing the capacity of the overall digital radio telecommunications system.

There are many schemes used to estimate the bit error rate. One technique is to estimate the Carrier to Noise (C/N) ratio and then to map the C/N ratio to a bit error ratio or signal quality band. This scheme is very well suited for analogue radio systems. One problem, however, is that this scheme gives very poor performance at low C/N ratios.

A well known approach for generating a BER estimate mainly consists of re-encoding the corrected received signal and compare the re-encoded signal to the uncorrected signal to calculate a bit error rate based on differences between the re-encoded and the received bit pattern. An example of such a re-encoding approach to bit error rate calculation is illustrated in patent GB 2305083.

However, since there is no guarantee that the channel decoder always corrects an erroneous bit as well as it may also change a correct bit into an incorrect bit, the re-encoding of this possibly partially corrected signal with the uncorrected signal will result in an erroneously calculated BER. In other words, this method typically works best whenever the decoder successfully decodes all the received bits, i.e., when the BER is low enough for the error correction code to correct any errors.

A modified version of the re-encode and compare scheme is illustrated in patent application WO 01/99386 and which attempts to overcome the disadvantages of the patent GB 2305083. The modified re-encode and compare technique is essentially the same as patent GB 2305083 except that the re-encoding and comparison are done only for frames that pass a Cyclic Redundancy Check (CRC) following the channel decoder. That is, a CRC is performed on the output of the channel decoder before the output is re-encoded and compared to the uncorrected signal. The modified re-encode and compare scheme provides better performance than the conventional approach. However, the modified re-encode and compare scheme can be used only in cases where CRC bits are used for error detection. Hence, it is not always possible to implement the modified re-encode- and compare scheme. Another drawback is that the modified re-encode- and compare scheme skips frames that fail the CRC. There may not be sufficient frames left over in one measurement period to estimate the channel's BER. In such case, it is necessary to increase the measurement period and/or the number of frames, which is not always possible.

It is therefore an object of the present invention to deal with the aforementioned problems by providing a method or system to calculate to a high probability value the quality of the transmission which can be expressed as the BER, which represents the number of erroneous bits divided by the total number of bits transmitted, received, or processed over some stipulated period.

SUMMARY OF THE INVENTION

It is an object of the present invention to provide an improved system and method for BER estimation of the received information in a telecommunications system.

It is a further object of the present invention to provide a method for bit error rate measurement for communication channels in a telecommunications system utilizing turbo coding for bit error correction.

It is a still further object of the present invention to provide systems and methods performing improved estimates of bit error rate with low computational load and which provide such estimates over a range of error rates, especially over low signal to noise ratios.

It is a still further object of the present invention to provide an average BER estimate based on the BER contribution of each bit of the received data frame that was turbo-encoded, further processed and finally transmitted over the communication channel by a transmitter station.

The receiver station performs a series of operations on the received data frame, such as down conversion, filtering, demodulation, demultiplexing and turbo-decoding.

The decoder produces soft output S5 representing the likelihood of a received bit in the data frame being a logical 1 or a logical 0. The likelihood values are, according to the present invention mapped to a lookup table, the table selected out of a plurality of look-up tables, containing for each range of likelihood values the corresponding contribution of each received data frame bit to the estimated BER. The decoder in one embodiment is a turbo-decoder.

A quantizer quantizes the received data frame, and the quantized bit operates on a switch that selects the output of the appropriate look-up-table. These bit-wise BER estimates may be averaged over a selected sampling window to arrive at an average bit error rate estimate.

Decoding bit-errors may occur, but as they are submitted to posterior bit error rate estimation, systematic errors that normally happen at low SNR, are avoided.

The present invention provides for systems and methods for determining estimates of bit error rate by utilizing look-up tables and which result in low circuit complexity and reduced load for the receiver. This is particularly beneficial for a mobile type receiver, such as a mobile terminal, which must often operate for extended periods on battery power and which contains limited memory.

BRIEF DESCRIPTION OF THE DRAWINGS

The FIGURE shows, in a schematic and illustrative manner, a preferred embodiment according to the invention.

DETAILED DESCRIPTION OF THE INVENTION

Figure 1:
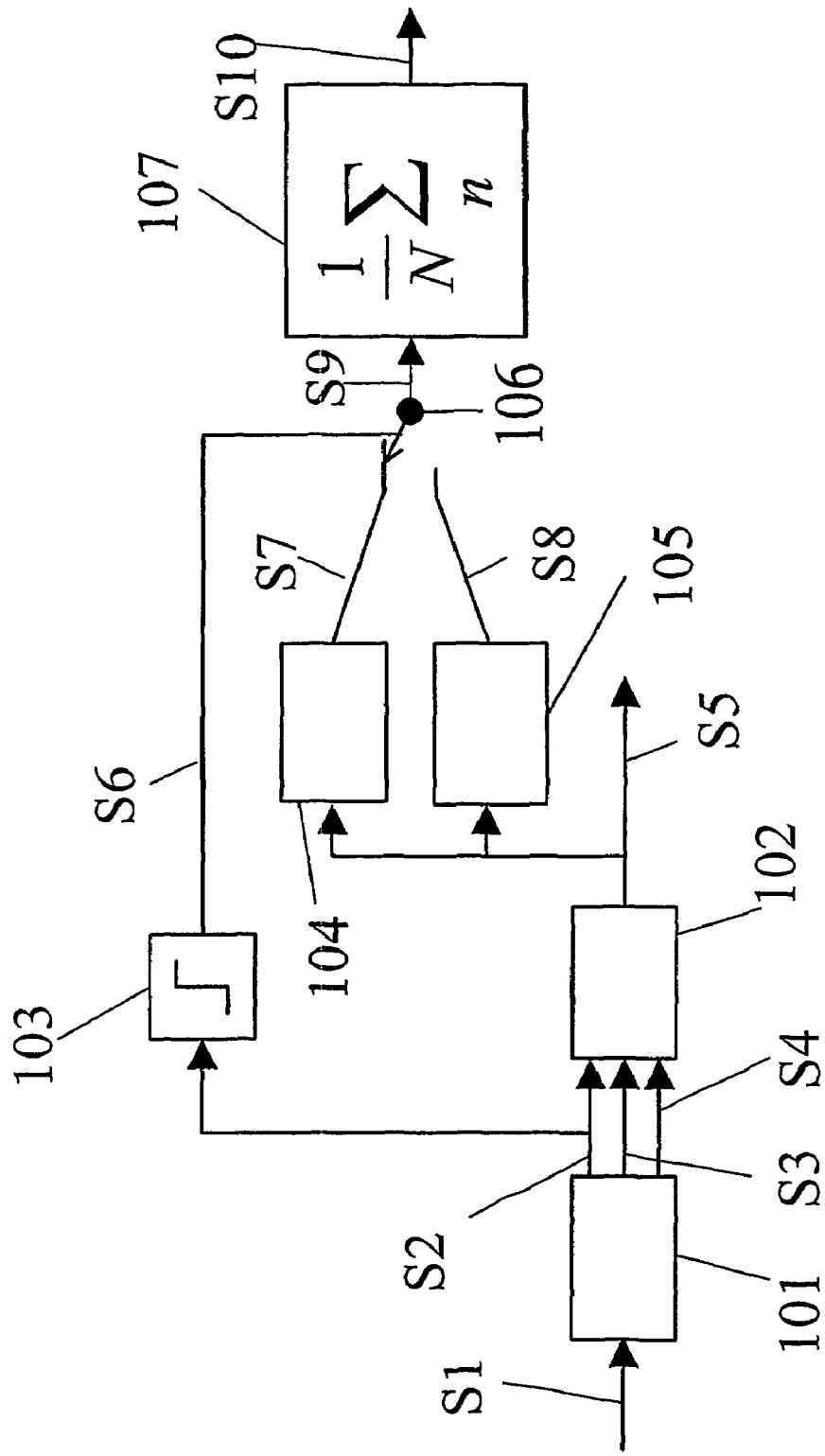

The present invention will now be described more fully hereinafter with reference to the accompanying figure, in which the preferred embodiment of the invention is shown.

The Bit Error Rate (BER) calculation method and system of the present invention is used in a digital communication system and more precisely in the receiver station of the digital communication system.

As known by those persons skilled in the art, the receiving station includes a receiver (not shown), demodulator (not shown), demultiplexer 101 and a decoder 102. The demodulator (not shown) produces a data stream consisting of soft bits S1. The demultiplexer splits this stream into the soft systematic input S2 and one or more soft parity inputs S3, S4. Streams S2, S3 and S4 are input to the decoder 102.

The decoder 102, upon receiving a complete data block, processes the inputs and produces soft-output S5 representing the likelihood of a received bit in the data frame being a logical 1 or a logical 0. The soft-output S5 of the decoder 102 is used as a pointer to look-up tables 104 and 105. Look-up table 104 contains for each range of likelihood values L the corresponding contribution of each received data frame bit to the BER when the received data frame bit has the logical value 0. Look-up table 105 contains for each range of likelihood values L the corresponding contribution of each received data frame bit to the BER when the received data frame bit has the logical value 1. For table 104 this can be expressed as $[1+L(n)]^{-1}$ and for table 105 as $[1-(1+L(n))^{-1}]$.

The encoded soft systematic input S2 is also coupled to a soft-to-hard quantizer 103 which translates soft-decision integer values to the hard-decision logical binary values S6. The quantized bit S6 operates on a switch 106 that selects the output S7 of table 104 if the quantized bit is a 1 and the output S8 of table 105 if the quantized bit S6 is a 0. The switching and selection can be expressed according to the equation:

$S9=Pr(n)$ if $S6 =1$ $S9=[1 -Pr(n)]$ if $S6 =0$

Pr(n) represents the a posteriori probability that the transmitted bit equals 0.

The selected output S7, S8 is used as input S9 to an accumulation and scaling device 107 obtaining the estimated average BER Each table contains for obtained likelihood values (soft output) the corresponding BER contribution as indicated in the exemplary tables 1 and 2. As known by those skilled in the art, the look-up tables are based on probability values, according to the equation:

$$Pr(n) = \frac{L(n)}{L(n) + 1}$$

wherein Pr(n) represents the a posteriori probability that the transmitted bit equals 0, L(n) is the likelihood ratio of the output bit n, and applies to MAP decoders.

For log-map decoders, Max-log MAP decoders and a SOVA decoders the contents of table 104 is $(1+e^\Lambda)^{-1}$ and of table 105 $1-(1+e^\Lambda)^{-1}$. As known by those skilled in the art, the look-up tables are based on probability values, according to the equation:

$$Pr(n) = \frac{e^{\Lambda(n)}}{e^{\Lambda(n)} + 1}$$

wherein $\Lambda$ is the log likelihood ratio.

Although a preferred embodiment of the system, method and apparatus of the present invention has been illustrated in the accompanying drawing and described in the foregoing detailed description, it is to be understood that the invention is not limited to the embodiments disclosed, but is capable of rearrangements, modifications and substitutions without departing from the spirit of the invention as set forth and defined by the following claims.

TABLE 1

Exemplary contents of a look-up table for MAP decoding. As understood by those skilled in the art, the contribution of quantization effects from table look-up to the BER measurement result can be made arbitrary small by refining the look-up-table.

| Observed Likelihood Value L (soft output) | | BER contribution |
|---|---|---|
| From | To | from $[1 + L(n)]^{-1}$ |
| 0 | 0.066667 | 0 |
| 0.066667 | 0.230769 | 0.125 |
| 0.230769 | 0.454545 | 0.25 |
| 0.454545 | 0.777778 | 0.375 |
| 0.777778 | 1.285714 | 0.5 |
| 1.285714 | 2.2 | 0.625 |
| 2.2 | 4.333333 | 0.75 |
| 4.333333 | 15 | 0.875 |
| 15 | INFINITY | 1 |

TABLE 2

Exemplary contents of a look-up table for LOG-MAP, MAX-LOG-MAP and SOVA decoding. As understood by those skilled in the art, the contribution of quantization effects from table look-up to the BER measurement result can be made arbitrary small by refining the look-up-table.

| Observed Log-Likelihood Value (soft output) | | |
|---|---|---|
| From | To | BER contribution from $\frac{1}{e^{\Lambda(n)} + 1}$ |
| −INFINITY | −2.70805 | 0 |
| −2.70805 | −1.46634 | 0.125 |
| −1.46634 | −0.78846 | 0.25 |
| −0.78846 | −0.25131 | 0.375 |
| −0.25131 | 0.251314 | 0.5 |
| 0.251314 | 0.788457 | 0.625 |

TABLE 2-continued

Exemplary contents of a look-up table for LOG-MAP, MAX-LOG-MAP and SOVA decoding. As understood by those skilled in the art, the contribution of quantization effects from table look-up to the BER measurement result can be made arbitrary small by refining the look-up-table.

| Observed Log-Likelihood Value (soft output) | | BER contribution from $\frac{1}{e^{\wedge(n)}+1}$ |
|---|---|---|
| From | To | |
| 0.788457 | 1.466337 | 0.75 |
| 1.466337 | 2.70805 | 0.875 |
| 2.70805 | INFINITY | 1 |

What is claimed is:

1. A system for determining a bit error rate in a digital communication system, comprising:
   a transmitting station;
   a receiving station having a decoder;
   the transmitting station arranged for transmitting a bit sequence to a receiving station;
   the receiving station arranged for receiving the bit sequence;
   the decoder arranged for decoding one or more bits out of the received bit sequence;
   a plurality of look-up tables arranged for containing predetermined bit error rates related to ranges of soft output values;
   a quantizer being arranged for quantizing the received bit;
   a switch being arranged for selecting an output, representing a Bit error Rate contribution, of one of the look up tables out of the plurality of look up tables, the selection being based on the quantized bit;
   a soft-output of the decoder being arranged as an index to the plurality of look up tables for retrieving a bit-wise bit error rate contribution to the bit error rate of a received bit sequence; and
   a summing and scaling device being arranged for accumulating and averaging the bit-wise BER.

2. The system as claimed in claim 1, wherein the lookup tables are replaced by one or more processing devices, arranged for providing accompanying values for the Bit Error Rate contribution on input of the value of the soft output.

3. The system as claimed in claim 2, wherein the processing device is a floating point processor.

4. The system as claimed in claim 1, wherein the decoder is a turbo-decoder.

5. The system as claimed in claim 1, wherein the decoding algorithm is the Maximum A Posteriori algorithm (MAP).

6. The system as claimed in claim 1, wherein the decoding algorithm is the Logarithmic Maximum A Posteriori algorithm (LOG-MAP).

7. The system as claimed in claim 1, wherein the decoding algorithm is the Maximum-Logarithmic-Maximum A Posteriori algorithm (MAX-LOG-MAP).

8. The system as claimed in claim 1, wherein the decoding algorithm is the Soft Output Viterbi Algorithm (SOVA).

9. A receiving station system arranged for determining a bit error rate in transmitted bit sequence, comprising:
   a decoder arranged for decoding one or more bits out of the received bit sequence;
   a plurality of look-up tables arranged for containing predetermined bit error rates related to ranges of soft output values;
   a quantizer being arranged for quantizing the received bit;
   a switch being arranged for selecting an output representing a Bit Error Rate contribution, of one of the plurality of look up tables, the selection being based on the quantized bit;
   a soft-output of the decoder being arranged as an index to the plurality of look up tables for retrieving a bit-wise bit error rate contribution to the bit error rate of a received bit sequence;
   a summing and scaling device being arranged for accumulating and averaging the bit-wise BER.

10. The receiving station system as claimed in claim 9, wherein the receiving station system is a mobile unit within a wireless communication system.

11. The receiving station system as claimed in claim 9, wherein the receiving station is a radio base station within a CDMA communication system.

12. The receiving station system as claimed in claim 9, wherein the receiving station system operates in a wireless communication network according to a GSM, Bluetooth, or Code Division Multiple Access (CDMA) standard.

13. A method for determining a bit error rate in a digital communication system comprising a transmitting station and a receiving station having a decoder comprising the steps of:
   transmitting a bit sequence to the receiving station by the transmitting station;
   receiving the bit sequence by the receiving station;
   decoding a bit out of the received bit sequence by the decoder;
   quantizing the received bit by a quantizer;
   selecting an output of a look up table, the look up table being one of a plurality of look up tables, the selection being based on the quantized bit;
   indexing the selected look up table, for obtaining a bit-wise bit error rate of the received bit sequence, by the soft-output of the decoder;
   accumulating and averaging the bit-wise BER of the received bit sequence by a summing and scaling device, resulting in the estimated average BER.

14. The method as claimed in claim 13, wherein the decoding method is turbo-decoding.

15. The method as claimed in claim 13, wherein the decoding algorithm is the Maximum A Posteriori algorithm (MAP).

16. The method as claimed in claim 13, wherein the decoding algorithm is the Logarithmic Maximum A Posteriori algorithm (LOG-MAP).

17. The method as claimed in claim 13, wherein the decoding algorithm is the Maximum-Logarithmic-Maximum A Posteriori algorithm (MAX-LOG-MAP).

18. The method as claimed in claim 13, wherein the decoding algorithm is the Soft Output Viterbi Algorithm (SOVA).

* * * * *

UNITED STATES PATENT AND TRADEMARK OFFICE
CERTIFICATE OF CORRECTION

PATENT NO. : 7,607,053 B2
APPLICATION NO. : 10/596856
DATED : October 20, 2009
INVENTOR(S) : Moelker It is certified that error appears in the above-identified patent and that said Letters Patent is hereby corrected as shown below:

In The Specifications:

In Column 5, Line 62, after "BER" insert -- S10. --.

In Column 6, Line 12, delete "105" and insert -- 105 is --, therefor.

In The Claims:

In Column 7, Line 34, in Claim 1, delete "Bit error Rate" and insert -- Bit Error Rate --, therefor.

In Column 8, Line 31, in Claim 13, delete "decoder" and insert -- decoder, --, therefor.

Signed and Sealed this

Fourteenth Day of December, 2010

David J. Kappos
*Director of the United States Patent and Trademark Office*